(12) United States Patent
Perla et al.

(10) Patent No.: US 8,797,877 B1
(45) Date of Patent: Aug. 5, 2014

(54) VIRTUAL OUTPUT QUEUE ALLOCATION USING DYNAMIC DRAIN BANDWIDTH

(75) Inventors: Srinivas Perla, Saratoga, CA (US); Sanjeev Kumar, San Jose, CA (US); Avanindra Godbole, San Jose, CA (US); Srihari Vegesna, Bangalore, IN (US); Sarin Thomas, Sunnyvale, CA (US); Mahesh Dorai, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 118 days.

(21) Appl. No.: 13/570,419

(22) Filed: Aug. 9, 2012

(51) Int. Cl.
*H04J 3/14* (2006.01)
(52) U.S. Cl.
USPC ............................ 370/235; 370/230; 370/252
(58) Field of Classification Search
CPC ......... H04L 47/10; H04L 47/30; H04L 47/11; H04L 47/12; H04L 47/15; H04L 47/70; H04L 47/2441; H04L 47/22; H04L 47/50; H04L 47/21; H04L 47/20
USPC ................................ 370/230.1, 231–237, 252
See application file for complete search history.

(56) References Cited

U.S. PATENT DOCUMENTS

| 6,976,154 | B1 | 12/2005 | Dyckerhoff et al. |
| 7,733,781 | B2 * | 6/2010 | Petersen ...................... 370/235 |

* cited by examiner

*Primary Examiner* — Dady Chery
(74) *Attorney, Agent, or Firm* — Shumaker & Sieffert, P.A.

(57) ABSTRACT

In general, techniques are described for allocating virtual output queue (VOQ) buffer space to ingress forwarding units of a network device based on drain rates at which network packets are forwarded from VOQs of the ingress forwarding units. For example, a network device includes multiple ingress forwarding units that each forward network packets to an output queue of an egress forwarding unit. Ingress forwarding units each include a VOQ that corresponds to the output queue. The drain rate at any particular ingress forwarding unit corresponds to its share of bandwidth to the output queue, as determined by the egress forwarding unit. Each ingress forwarding unit configures its VOQ buffer size in proportion to its respective drain rate in order to provide an expected delay bandwidth buffering for the output queue of the egress forwarding unit.

19 Claims, 7 Drawing Sheets

VIRTUAL OUTPUT QUEUE ALLOCATION USING DYNAMIC DRAIN BANDWIDTH

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of forwarding units (referred to in some examples as packet forwarding engines (PFEs)) and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding structures generated by the control unit in accordance with the routing information and control information. The control unit installs the forwarding structures within the data plane to programmatically configure the forwarding components. The data and instructions that constitute the forwarding structures define an internal forwarding path for each incoming packet received by the network device. For example, to generate a route table lookup forwarding structure, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the PFEs to update the FIB within each of the PFEs and control traffic forwarding within the data plane.

In some examples Virtual Output Queues (VOQs) are used to prevent Head-of-Line blocking at output interfaces. Head-of-Line blocking may occur when a line of packets are delayed because a previously queued packet cannot be forwarded to an output destination. In one example, an egress PFE may include a VOQ for each ingress PFE that forwards packets to the egress PFE. The VOQ for a particular ingress PFE may be a logical queue corresponding to the output queue at the egress PFE. As ingress PFEs forward network packets to the egress PFE, the egress PFE buffers the network packets using the VOQs. The egress PFE may use a shared buffer space for the VOQs to store the network packets until the packets are forwarded to an output destination. Because the VOQs are managed on the egress PFE in such examples, a single ingress PFE may flood the egress PFE with packets thereby using all of the shared buffer space. Consequently, when the egress PFE makes a drop decision, the drop decision is shared across all ingress PFEs regardless of the PFE causing the congestion. In some examples, both the ingress PFE and egress PFE may also each store and read on the respective ingress and egress PFE's buffer space when processing a network packet. For example, store and read operation operations may occur twice when processing each network packet, i.e., once on the ingress buffer space and once on the egress buffer space.

SUMMARY

The techniques described herein are directed to allocating VOQ buffer space to ingress forwarding units based on drain rates at which network packets are forwarded from VOQs of the ingress forwarding units. In accordance with techniques of the disclosure, a router includes multiple ingress forwarding units that each forward network packets to an output queue of an egress forwarding unit. To buffer network packets when the egress forwarding unit experiences congestion, ingress forwarding units each include a VOQ that corresponds to the output queue. The logical size of the output queue is divided across the VOQs of the ingress forwarding units such that the collective size of the VOQs is equal to the logical size of the output queue. The drain rate at any particular ingress forwarding unit corresponds to its share of bandwidth to the output queue, as determined by the egress forwarding unit. Each ingress forwarding unit configures its VOQ buffer size in proportion to its respective drain rate in order to provide an expected delay bandwidth buffering for the output queue of the egress forwarding unit. Because the drain rates of the VOQs may vary depending on the number of ingress forwarding units that forward network packets to the egress forwarding unit, each ingress forwarding unit dynamically varies its VOQ buffer size in response to determined changes in drain rates.

In some examples, ingress forwarding units may drop packets based on the determined drain rates when VOQ buffer sizes exceed thresholds for the drain rates. By dropping network packets, for example, an ingress forwarding unit can maintain its respective VOQ buffer size thereby maintaining the collective logical size of the output queue across all ingress forwarding units. Moreover, techniques of the disclosure may reduce and/or eliminate the need for control signaling of VOQ buffer sizes between ingress forwarding units because each ingress forwarding unit determines its VOQ buffer size based on the drain rate for its respective VOQ.

In one example, a method comprises determining, by a network device, a change in a drain rate at which network packets are forwarded from a Virtual Output Queue (VOQ) of an ingress forwarding unit of the network device to an egress forwarding unit of the network device, wherein the VOQ comprises a logical queue that corresponds to an output queue of the egress forwarding unit, wherein a size of the VOQ comprises a portion of a logical size of the output queue, wherein the logical size of the output queue is divided among a plurality of VOQs of a plurality of respective ingress forwarding units that includes at least the ingress forwarding unit. The method also comprises, in response to determining the change in the drain rate, modifying, at the ingress forwarding unit, the size of the VOQ in direct proportion to the determined change in the drain rate.

In another example, computer-readable storage medium comprises instructions for causing one or more programmable processors to determine, by a network device, a change in a drain rate at which network packets are forwarded from a Virtual Output Queue (VOQ) of an ingress forwarding unit of the network device to an egress forwarding unit of the network device, wherein the VOQ comprises a logical queue that corresponds to an output queue of the egress forwarding unit, wherein a size of the VOQ comprises a portion of a logical size of the output queue, wherein the logical size of the output queue is divided among a plurality of VOQs of a plurality of respective ingress forwarding units that includes at least the ingress forwarding unit. The instructions also cause the one or more programmable processors to, in response to determining the change in the drain rate, modify, at the ingress forwarding unit, the size of the VOQ in direct proportion to the determined change in the drain rate.

In another example, a network device comprises a plurality of forwarding units each comprising a packet forwarding engine and an interface. The network device also comprises a switch fabric connecting the plurality of forwarding units, wherein an ingress forwarding unit for a packet flow internally forwards packets of the packet flow to an egress one of the forwarding units for the packet flow by the switch fabric. The network device also comprises an output queue of the egress forwarding unit, wherein the output queue is associated with the interface of the egress forwarding unit. A Virtual Output Queue (VOQ) of the ingress forwarding unit comprises a logical queue that corresponds to an output queue of the egress forwarding unit, wherein a size of the VOQ comprises a portion of a logical size of the output queue, wherein the logical size of the output queue is divided among a plurality of VOQs of a plurality of respective ingress forwarding units for the packet flow that includes at least the ingress forwarding unit. A congestion manager of the ingress forwarding unit determines a change in a drain rate at which network packets are forwarded from a Virtual Output Queue (VOQ) of an ingress forwarding unit of the network device to an egress forwarding unit of the network device, wherein the congestion manager, in response to determining the change in the drain rate, modifies the size of the VOQ in direct proportion to the determined change in the drain rate.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
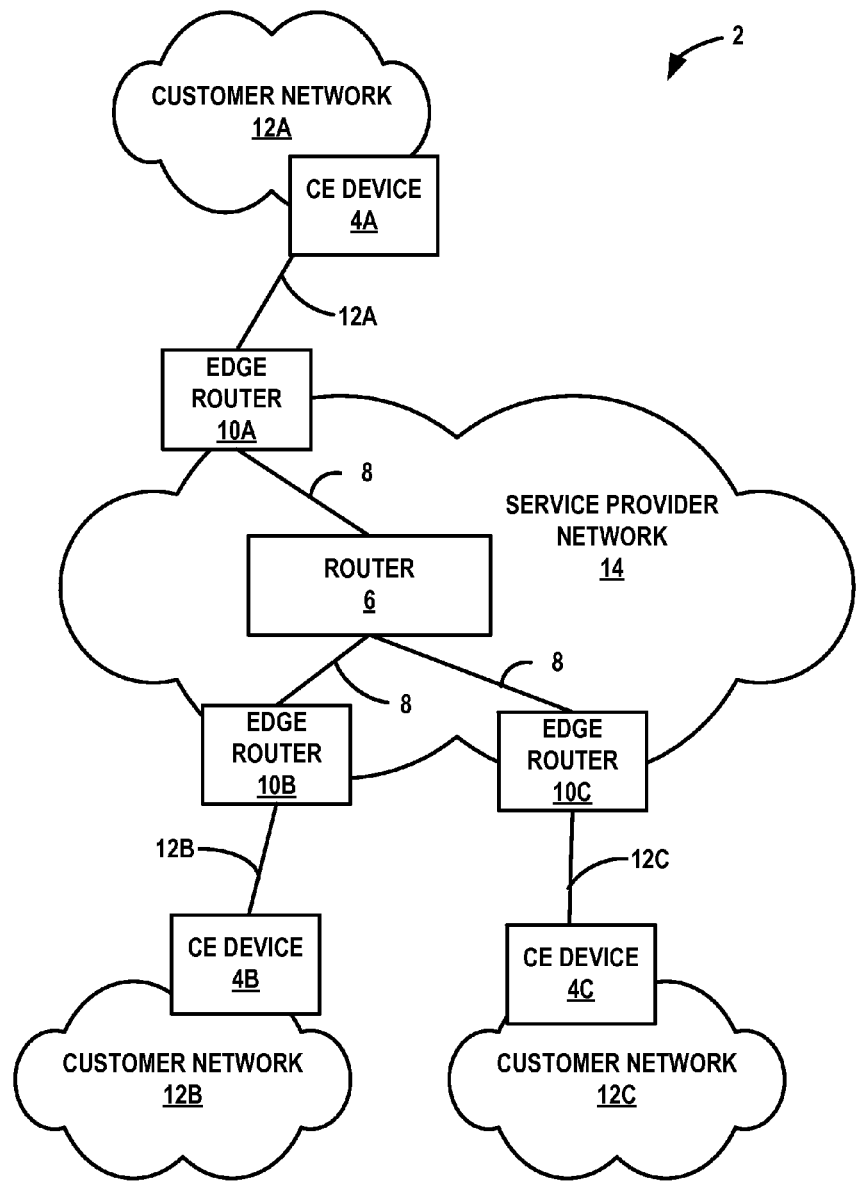
FIG. 1 is a block diagram illustrating an example system in which ingress forwarding units of a router may be configured to allocate shared VOQ buffer space based on drain rates at which network packets drain from VOQs of the ingress forwarding units in accordance with the techniques described herein.

FIG. 1 is a block diagram illustrating an example system 2 in which ingress forwarding units of router 6 may be configured to allocate shared VOQ buffer space based on drain rates at which network packets drain from VOQs of the ingress forwarding units in accordance with the techniques described herein. In this example, edge routers 10A-10C ("edge routers 10") provide customer edge (CE) devices 4A-4C ("CE devices 4") associated with customer networks 12A-12C ("customer networks 12") with access to service provider network 14. In the illustrated embodiment, edge router 10A is coupled to CE device 4A via access link 12A. Edge router 10B is coupled to CE device 4B via access link 12B, and edge router 10C is coupled to CE device 4C via access link 12C. CE devices 4 may be, for example, routers or switches. Customer networks 12 may be, for example, networks for geographically separated sites of an enterprise. Each of customer networks 12 may include one or more additional computing devices (not shown), such as, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 12. Nonetheless, for ease of description, only customer networks 12A-12C are illustrated in FIG. 1.

In accordance with the techniques described herein, one or more of router 6, edge routers 10, and CE devices 4 are configured to route network packets in accordance with forwarding information generated by the respective devices. For example, each of edge routers 10 and router 6 may include one or more packet forwarding engines (PFEs) (also referred to as "forwarding units") configured to switch packets from an input interface to an output interface of the router using a switch fabric internal to the router. When router 6, for example, receives packets, the ingress PFE performs a lookup using forwarding information and forwards the network packet across an internal switch fabric of router 6 to an egress PFE the router. In some examples, router 6 may include multiple ingress PFEs that each route network packets to the egress PFE of router 6. Consequently, network packets from multiple ingress PFEs may "fan in" to a single egress PFE of router 6.

Although not illustrated, service provider network 14 may be coupled to one or more networks administered by other providers, and may thus form part of a large-scale public network infrastructure, e.g., the Internet. Consequently, customer networks 12 may be viewed as edge networks of the Internet. Service provider network 14 may provide computing devices within customer networks 12 with access to the Internet, and may allow the computing devices within the customer networks to communicate with each other. Service provider network 14 may include a variety of network devices other than edge routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of links 8 and/or 12, such that the network elements of system 2 are not directly coupled.

Router 6 or edge routers 10 may be multi-chassis routers that include multiple routing nodes (not shown in FIG. 1) that are physically coupled and configured to operate as a single routing node. That is, to peer routers of network environment 2, router 6 or edge routers 10 each appear as a single routing device. For example, although edge router 10A includes a plurality of routing nodes, from the perspective of peer router 10B, the multi-chassis edge router 10A has a single network address and maintains single peer routing sessions for each routing protocol maintaining peer routing sessions with each of the edge routers 10.

As previously described, router 6 may include multiple PFEs. In some examples, the multiple PFEs may be configured as either ingress PFEs or egress PFEs for various packet flows. Ingress PFEs for a packet flow receive network packets from other network devices such as edge routers 10 and route the network packets to an egress PFE for the packet flow based on forwarding information. In some examples, ingress PFEs include one or more network interfaces to receive the network packets via links 8. The ingress PFEs forward network packets to egress PFEs of router 6 using a switch fabric that operatively interconnects ingress and egress PFEs in router 6.

Egress PFEs receive network packets from ingress PFEs via the switch fabric and route the network packets to other network devices, such as edge routers 10. In some examples, the egress PFEs include one or more network interfaces to route the network packets to edge routers 10 via links 8. Because a single egress PFE of router 6 can receive network packets from multiple ingress PFEs, the network packets may be buffered to reduce and/or eliminate packet dropping due to congestion at the egress PFE.

In accordance with techniques of the disclosure, each ingress PFE of router 6 may include one or more VOQs for each egress interface to which the ingress PFE forwards packets. Each VOQ is a logical queue that represents a corresponding output queue of the respective egress PFE. In some examples, VOQs and corresponding output queues for each egress interface may be assigned to priority levels to enable quality of service (QoS)/class of service (CoS) guarantees for router 6. For example, an egress interface of an egress PFE of router 6 may have eight outputs queues corresponding to eight different network traffic priority levels. As a result, each ingress PFE of router 6 may have a corresponding eight VOQs for the eight output queues of the egress interface. As network packets are received by an ingress PFE, the network packets are stored in VOQs for the corresponding egress interfaces of egress PFEs until, for example, an ingress PFE receives a message from the egress PFE that a network packet may be forwarded to the egress interface. This may reduce an amount of storage required by an egress PFE to buffer packets from multiple ingress PFEs and may avoid packet "double-buffering," whereby a packet is deeply queued once in its ingress PFE and again in its egress PFE. In some examples, the egress PFE uses one or more scheduling techniques divide the bandwidth across the ingress PFEs when requesting network packets.

Example techniques of the disclosure map a logical buffer space of an output queue for a given egress PFE across all of the ingress PFEs that send network packets to the egress PFE. That is, the logical size of the buffer space for an output queue on an egress interface is divided across all of the ingress PFEs that route network packets to the egress PFE. Stated another way, the collective size of the buffer spaces for all VOQs that correspond to the output queue may be equal to the logical size of the output queue on an egress interface.

Because each ingress PFE includes VOQs for the respective output queues of egress PFEs, each ingress PFE rather than each egress PFE determines whether to drop network packets. Consequently, the output queue of an egress interface may include only a shallow buffer that is capable of storing a quantity of network data that is equal to the amount of network data that may be transmitted in the roundtrip latency of the switch fabric.

In accordance with techniques of the disclosure, ingress PFEs dynamically modify the buffer sizes of respective VOQs based on the rate (e.g., "drain rate") at which network packets are dequeued from the respective VOQs and forwarded to the egress PFE. More specifically, the buffer size of a given VOQ at an ingress interface may be directly proportional to the rate at which network packets are forwarded to the egress PFE by an ingress PFE. Ingress PFEs may dynamically modify the buffer sizes to maintain one or more throughput requirements, such as a target switch fabric link utilization rate (e.g., 95-100% utilization). As the number of sources, i.e., ingress PFEs, sending network packets increases, each ingress PFE reduces the buffer size of its VOQs in response to a decreasing drain rate of its respective VOQ. Because each ingress PFE reduces its buffer size in response to the increased number of sources, the techniques of the disclosure dynamically maintain the collective logical size of the output queue of the egress interface across all of the VOQs of the ingress PFEs. In this way, as the number of sources of network packets varies, techniques of the present disclosure enable each ingress PFE to dynamically modify the size of its VOQ buffer space that corresponds to its share of the buffer space of the output queue of the egress PFE. Each ingress PFE can therefore independently maintain the size of its buffer space for a given VOQ based on its VOQ drain rate rather than using control signaling between the respective ingress PFEs. Moreover, because the egress PFE uses scheduling techniques to fairly request packets from each of the ingress PFEs, an ingress PFE that experiences a rapid increase in network packets received may drop more network packets than a non-congested ingress PFE. In this way, a single, congested ingress PFE may not dominate the packet forwarding bandwidth to the egress PFE.

Although discussed for purposes of example primarily with respect to routers, the techniques of this disclosure may be implemented by other network devices as well. For example, switches may implement the techniques of this disclosure in some examples to improve Layer Two (L2) (that is, Data Link Layer) functionality of the switches. In some examples, the techniques of this disclosure may be implemented by Ethernet switches. Although the techniques of this disclosure are described for purposes of example with respect to service provider network 14 and customer networks 12, the techniques may be similarly applied in devices associated with other contexts, such as non-edge routers and non-edge customer devices as well as L2, L3, and L2/L3 switches, among other devices, within service provider network 14 and customer networks 12.

Figure 2:
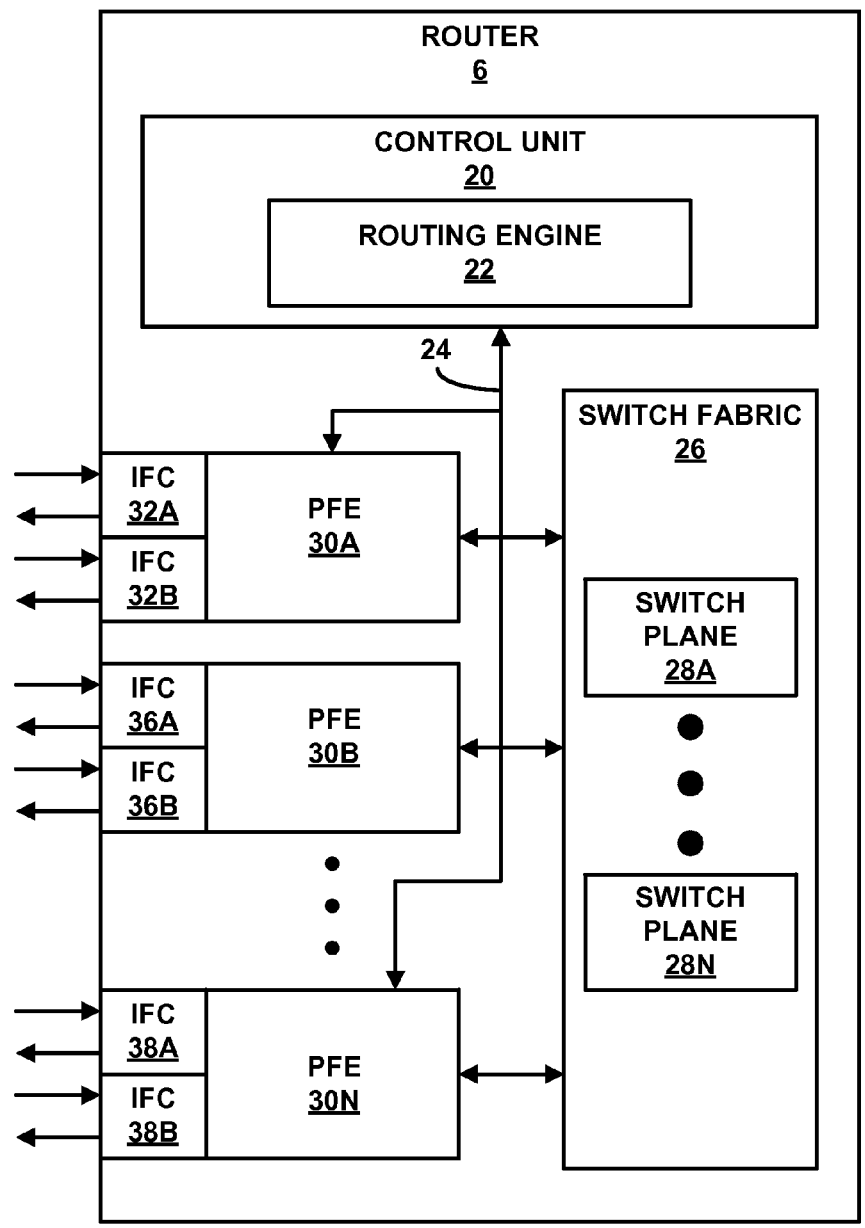
FIG. 2 is a block diagram illustrating the example router in greater detail.

FIG. 2 is a block diagram illustrating example router 6 of FIG. 1 in greater detail. Router 6 includes PFEs 30A-20N ("PFEs 30") capable of implementing techniques of the disclosure and switch fabric 26. In this example, router 6 also includes a control unit 20 that includes a routing engine 22. PFEs 30 may receive and send data via interface cards 32A-32B, 36A-36B, and 38A-38B ("IFCs 32", "IFCs 36", and "IFCs 38", respectively). In other embodiments, each of PFEs 30 may comprise more or fewer IFCs. Switch fabric 26 provides an interconnect mechanism for forwarding data between PFEs 30 for transmission over a network, e.g., the Internet.

Routing engine 22 maintains routing tables, executes routing protocol and controls user access to router 6. In this example, routing engine 22 is connected to each of PFEs 30 by a dedicated link 24, which may be an internal Ethernet link. For example, dedicated link 24 may comprise a 100 Mbps Ethernet connection. Routing engine 22 maintains routing information that describes a topology of a network, and derives a forwarding information base (FIB) in accordance with the routing information. Routing engine 22 copies the FIB to each of PFEs 30. This allows the FIB in each of PFEs 30 to be updated without degrading packet forwarding performance of router 6. Alternatively, routing engine 22 may derive separate FIBs which are copied to respective PFEs 30.

In a routing node, a "switch plane" is generally capable of providing a communication path between any two of PFEs 30. In this example, switch fabric 26 consists of multiple standalone switch planes 28A through 28N ("switch planes 28"). In some embodiments, each of switch planes 28 is provided by one or more switch fabric chips on one or more separate, removable switch cards. Other routing nodes that implement the techniques described herein may comprise additional or fewer switch planes, including a single switch plane. A majority of the switch planes may be active at any given time with data packets distributed over the active switch planes. The inactive switch plane(s) of switch fabric 26 serves as back-up switch plane(s) such that if one or more of the active switch planes goes offline, the back-up switch plane(s) automatically activate, and the bandwidth capacity of standalone router 10 is not diminished. The back-up switch plane(s) may be identical to the active switch planes and act as hot spare(s) to maintain bandwidth capacity in the event that one or more of the active switch planes fail. Each of switch planes 28 is operationally independent; therefore, standalone router 6 may continue to forward packets as long as at least one of switch planes 28 remain active, but possibly at a reduced bandwidth capacity.

As part of a standalone router, switch planes 28 form a standalone switch fabric 26. That is, each of switch planes 28 is capable of providing a connection between any of PFEs 30 within router 6. In this manner, switch planes 30 form a standalone switch fabric that enables packet forwarding between the plurality of PFEs 30 of router 6. For example, switch fabric 26 may be provided by a set of removable switch cards, where each removable switch card provides a respective one of switch planes 28.

As shown in FIG. 2, PFE 30A and PFE 30B may be ingress PFEs that receive network packets at one or more of interfaces 32A-32B and 36A-36B, respectively. Ingress PFEs 30A and 30B may route the network packets to PFE 30N, which may be an egress PFE. Consequently, egress PFE 30 may route network packets to other network devices via one or more of network interfaces 38A-38B.

Because network packets fan in to egress PFE 30N from ingress PFEs 30A and 30B, each of ingress PFEs 30A and 30B may buffer network packets, in accordance with techniques of the disclosure to reduce and/or eliminate packet dropping. As described in FIG. 1, ingress PFEs 30A and 30B may each include a VOQ that corresponds to the output queue of egress PFE 30N. Each VOQ may be implemented using on-chip memory of an ingress PFE and/or off-chip memory (e.g., Dynamic Random-Access Memory (DRAM)) of the ingress PFE. For instance, ingress PFE 30A may include on-chip memory and off-chip memory. To store a network packet in a VOQ, ingress PFE 30A may store the network packet in the off-chip memory and a pointer to the network packet in the on-chip memory. The quantity of off-chip memory allocated to the VOQ represents the portion of the logical buffer space of the output queue of egress PFE 30N that is allocated to the corresponding VOQ of PFE 30A.

To initially determine the logical buffer size of the output queue (or "logical output queue size") of egress PFE 30N, ingress PFE 30A may determine the egress interface port rate and a delay bandwidth buffer, in units of bandwidth, configured for the output queue. PFE 30A determines the logical buffer size of the output queue by calculating:

$$B_{LogicalBufferSize} = B_{DelayBandwidthBufferOQ} \times P_{PortRateEgressPFE}$$

The delay bandwidth buffer configured for the output queue may represent an amount of buffering that would be required in a non-VOQ-based system in which the output queue buffers traffic immediately forwarded by the ingress PFEs. In some examples, PFE 30A may read configured data that includes the egress interface port rate and the delay bandwidth buffer for the output queue associated with the egress interface port rate. In other examples, PFE 30A may request and receive a message from PFE 30N and/or routing engine 22 that includes the port rate and delay bandwidth buffer for the output queue. In still other examples, ingress PFE 30A can determine the port rate and by forwarding packets to PFE 30N.

In one example, interface 38A ("egress interface 38A") may be an egress interface of PFE 30N. The port rate of egress interface 38A may be, for example, 10 Gigabits/second (Gbps) and the delay bandwidth buffer configured for the output queue may be 50 ms. Ingress PFE 30A may therefore determine a logical output queue size of 500 megabits (Mb) (i.e., 10 Gbps×50 ms=500 Mb). Ingress PFE 30B may also, in the same way, determine that the logical output queue size is 500 Mb. Ingress PFEs 30A, 30B may set the initial sizes of their respective VOQs to the logical size of the corresponding output queue.

Although each of ingress PFEs 30A and 30B determines the total logical buffer size of the output queue to be 500 Mb (in this example) and set their initial VOQ size to the same value, each of ingress PFEs 30A and 30B thereafter dynamically determines buffer sizes for their respective VOQs that collectively sum to the total logical buffer size of the output queue. In accordance with techniques of the disclosure, ingress PFEs 30A and 30B determine the buffers sizes of the respective VOQs based on the drain rate at which network packets are forwarded from the ingress PFEs to egress PFE 30N. Consequently, the buffer size of the VOQ for ingress PFE 30A may be directly proportional to the rate at which ingress PFE 30A dequeues network packets from the VOQ to egress PFE 30N.

If, for example, ingress PFE 30A determines, based on its drain rate, that ingress PFE 30A is the only ingress PFE forwarding network packets to egress PFE 30N, ingress PFE 30A may expand the buffer space of its VOQ to equal the total 500 Mb logical buffer size of the output queue. If, however, PFE 30B begins forwarding network packets to egress PFE 30N as well, ingress PFE 30A, in accordance with the techniques of the disclosure determines a change in the rate at which ingress PFE 30A can forward network packets to egress interface 30N. For instance, because egress PFE 30N receives network packets from ingress PFEs 30A and additionally ingress PFE 30B, the bandwidth available to ingress PFE 30A to send network packets is reduced. That is, the latency for ingress PFE 30A to forward a network packet to egress PFE 30N may increase in response to ingress PFE 30B also forwarding network packets. For instance, if egress PFE 30N uses a round-robin scheduling technique to receive network packets from ingress PFEs 30A and 30B, the latency for ingress PFE 30A may double in response to ingress PFE 30B forwarding network packets. Consequently, PFE 30A, in response to determining the decrease in the drain rate of its VOQ, decreases the buffer size of its VOQ to reflect the logical increase in the portion of the logical buffer size of the output queue that is allocated to ingress PFE 30B.

As one example, ingress interface 32A may receive an incoming data packet via a packet-based network link, such as an Ethernet link. A lookup module (not shown) within ingress PFE 30A determines a destination address, multicast forwarding tuple, or other keying information of the packet from the packet data and queries a forwarding information base (FIB) for a forwarding entry matching the keying information. A matching entry specifies the appropriate next hop interface for the packet. The next hop interface for the packet may be egress interface 38A of PFE 30N.

In accordance with techniques of the disclosure, one or more ingress PFEs 30A and 30B may include a VOQ bandwidth database that specifies the minimum and maximum buffers sizes of VOQs for various different drain rates. In this way, as network packets are received at, e.g., ingress interface 32A, ingress PFE 30A determines a drain rate of PFE 30A, and using the VOQ bandwidth database, determines whether the current size of the VOQ is within the minimum and maximum buffer size range specified by the VOQ bandwidth database. If, for example, the current buffer size of the VOQ is greater than the maximum buffer size specified by the VOQ bandwidth database for the VOQ drain rate, ingress PFE 30A may drop the packet.

In other examples, if the current buffer size of the VOQ for the given VOQ drain rate is less than the maximum buffer size, ingress PFE 30A may use one or more congestion avoidance techniques to determine whether to drop the network packet. If a congestion avoidance technique indicates to drop the packet, PFE 30A drops the network packet. Alternatively, if the congestion avoidance technique indicates not to drop the packet, PFE 30A can enqueue the network packet on the VOQ. For instance, PFE 30A stores the packet for future processing in an input buffer that represents the VOQ for the output queue of egress PFE 30N. The input buffer is typically a form of dynamic RAM (e.g., DRAM, SDRAM, DDR2 SDRAM, and the like) but may be another type of storage media. In some embodiments, the input buffer is shared among the various ingress PFEs 30A-30B of router 6 as distributed buffer memory. In this case, rather than packet data being transmitted across switch fabric 26 in the fabric cells, pointers to locations of the packet data in the input buffers may be what is transmitted in the fabric cells, such that the egress PFE can receive the pointers and read the data from the shared input buffer. Further details of the VOQ bandwidth database and the congestion avoidance techniques are described in the following figures of the application.

Network packets stored in the VOQ of ingress PFE 30A are queued and wait for scheduling to be switched across switch fabric 26 to the appropriate one or more egress PFEs 20. That is, egress PFE 30N, using a scheduler technique, receives a request from ingress PFE 30A to dequeue a network packet, and egress PFE 30N responds with a grant message to ingress PFE 30A. In response to receiving the grant message, ingress PFE 30A dequeues a network packet from the VOQ and sends the network packet to egress PFE 30N. When egress PFE 30N receives the network packet, egress PFE 30N may forward the network packet to another network device using egress interface 38B.

Control unit 20 may be implemented solely in software, or hardware, or may be implemented as combinations of software, hardware, or firmware. For example, control unit 20 may include one or more processors which execute software instructions. For example, control unit 20 may comprise a processor, such as one or more programmable processors, microprocessors, application specific integrated circuits, field programmable gate arrays, digital signal processors, or other equivalent integrated or discrete logic circuitry. Control unit 20 may comprise one or more processors that execute software instructions, such as those used to define a software or computer program, stored to a computer-readable storage medium, such as a storage device (e.g., a disk drive, or an optical drive), or memory (e.g., a Flash memory, random access memory, or RAM) or any other type of volatile or non-volatile memory that stores instructions (e.g., in the form of a computer program or other executable) to cause a programmable processor to perform the techniques described herein. Alternatively, control unit 20 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein.

Figure 3:
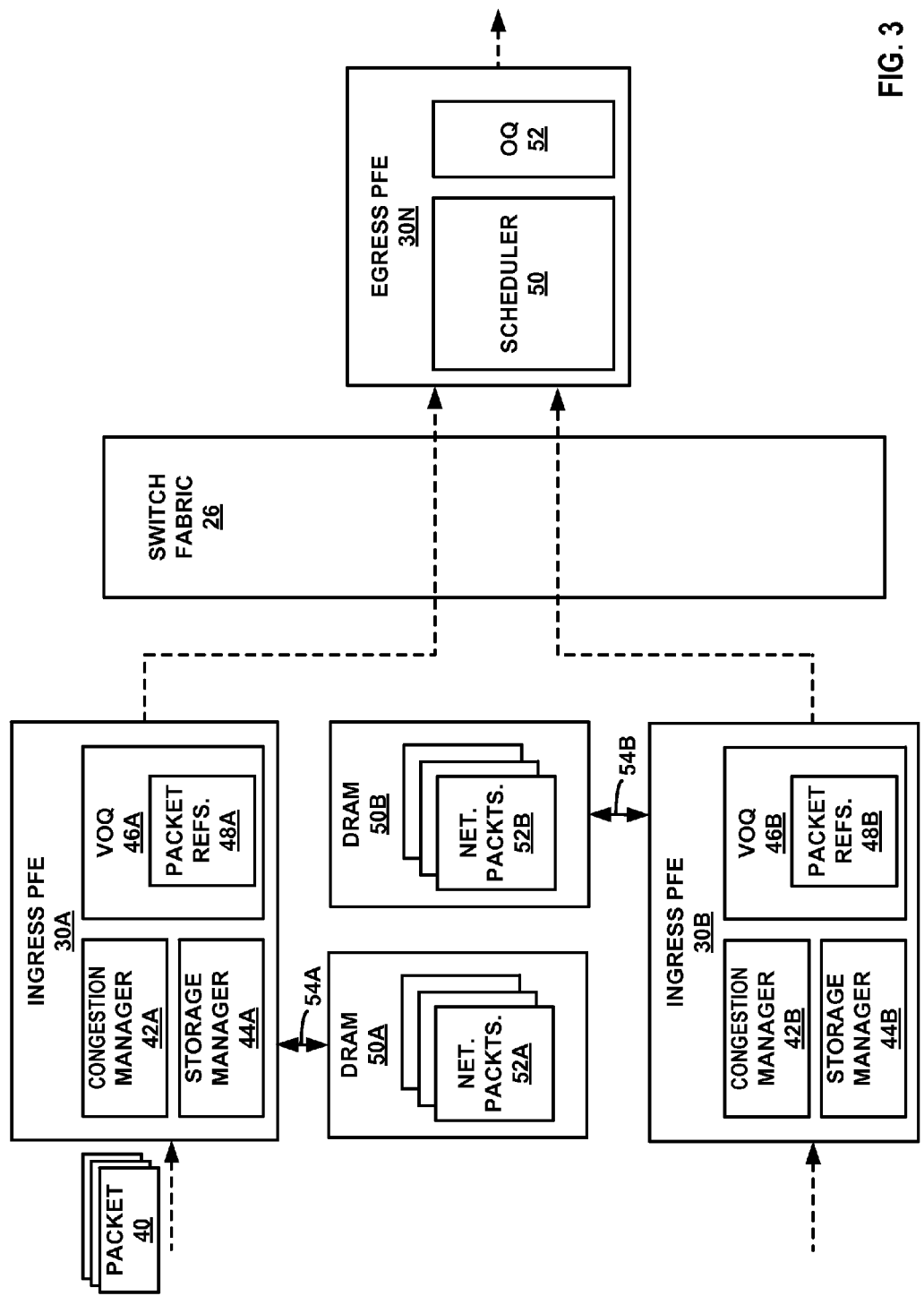
FIG. 3 is a block diagram illustrating in further detail ingress forwarding units of an example router operating in accordance with techniques of the present disclosure.

FIG. 3 is a block diagram illustrating in further detail ingress PFEs 30A, 30B and egress PFE 30N, in accordance with techniques of the present disclosure. FIG. 3 includes ingress PFE 30A, ingress PFE 30B, egress PFE 30N, and switch fabric 26 as shown in FIG. 2. FIG. 3 also includes Dynamic Random Access Memory (DRAM) 50A and DRAM 50B, which each respectively include packet data 52A and packet data 52B. DRAM 50A is operatively coupled to ingress PFE 50A by communication channel 54A, which in some examples may be an interconnect, such as an optical or silicon interconnect. Similarly, DRAM 50B is operatively coupled to ingress PFE 30B by communication channel 54B, which may also be an interconnect, such as an optical or silicon interconnect. Ingress PFE 30A further includes congestion manager (CM) 42A, storage manager (SM) 44A, VOQ 46A, and packet references 48A. Ingress PFE 30B includes CM 42B, SM 44B, VOQ 46B, and packet references 48B. Egress PFE 30N further includes schedulers 50 and output queue (OQ) 52. FIG. 3 includes simplified illustrations of the various components and other components not shown may also be included in, for example, ingress PFEs 30A, 30B and egress PFE 30N.

In the example of FIG. 3, egress PFE 30N receives network packets from ingress PFE 30A and ingress PFE 30B via switch fabric 26. Egress PFE 30N includes scheduler 50. Scheduler 50 implements one or more scheduling techniques such as round robin, random selection, etc., to service packet forwarding requests from ingress PFEs 30A, 30B. For instance, ingress PFEs 30A, 30B may each send requests to forward queued network packets to egress PFE 30N. Scheduler 50 processes the requests and sends grant messages in return using one or more scheduling techniques. In response to receiving the grant message, the respective ingress PFE forwards the network packet to egress PFE 30N. As shown in FIG. 3, egress PFE 30N also include output queue 52. Output queue 52 stores network packets received from ingress PFEs 30A, 30B prior to egress PFE 30N forwarding the packet.

Ingress PFE 30A, as shown in FIG. 3 includes VOQ 46A. VOQ 46A, in some examples, stores network packets prior to ingress PFE 30A sending the network packets to egress PFE 30N. VOQ 46A may be implemented using on-chip memory, off-chip memory (e.g., DRAM 50A), or as combination of on-chip and off-chip memory. In the example of FIG. 3, VOQ 46A is implemented using DRAM 50A to store network packets 52A and on-chip memory to store pointers or references to network packets 52A. In this way, fast but relatively scarce on-chip memory is used to maintain the state of packets stored in VOQ 46A while storing the data in relatively slower but cheaper off-chip memory. VOQ 46B, packet references 48B, DRAM 50B, and network packets 52B are configured in the same or similar manner as described with respect to previously described components of ingress PFE 30A. In the example of FIG. 3, each of VOQs 46A and 46B store network packets that are subsequently forwarded to egress PFE 30N and stored at output queue 52.

Ingress PFE 30A also includes storage manager 44A. Storage manager 44A manages and allocates pages of memory of DRAM 50A to store network packets 52A. For instance, storage manager 44A may maintain pages of memory for each VOQ that exists on ingress PFE 30A. In one example, each storage manager 44A maintains a data structure, such as a linked list of pages of memory, for each VOQ. When storage manager 44A receives a request to allocate or deallocate memory for a given VOQ, storage manger 44A determines the VOQ identified by the request and performs one or more operations to allocate or deallocate pages of memory. Storage manager 44A can further store one or more network packets specified by the request in DRAM 50A in an allocation request. In a deallocation request, storage manager 44A can free pages of memory that correspond to data specified in the request. Storage manager 44B may operate in the same or similar manner as storage manager 44A.

Figure 4:
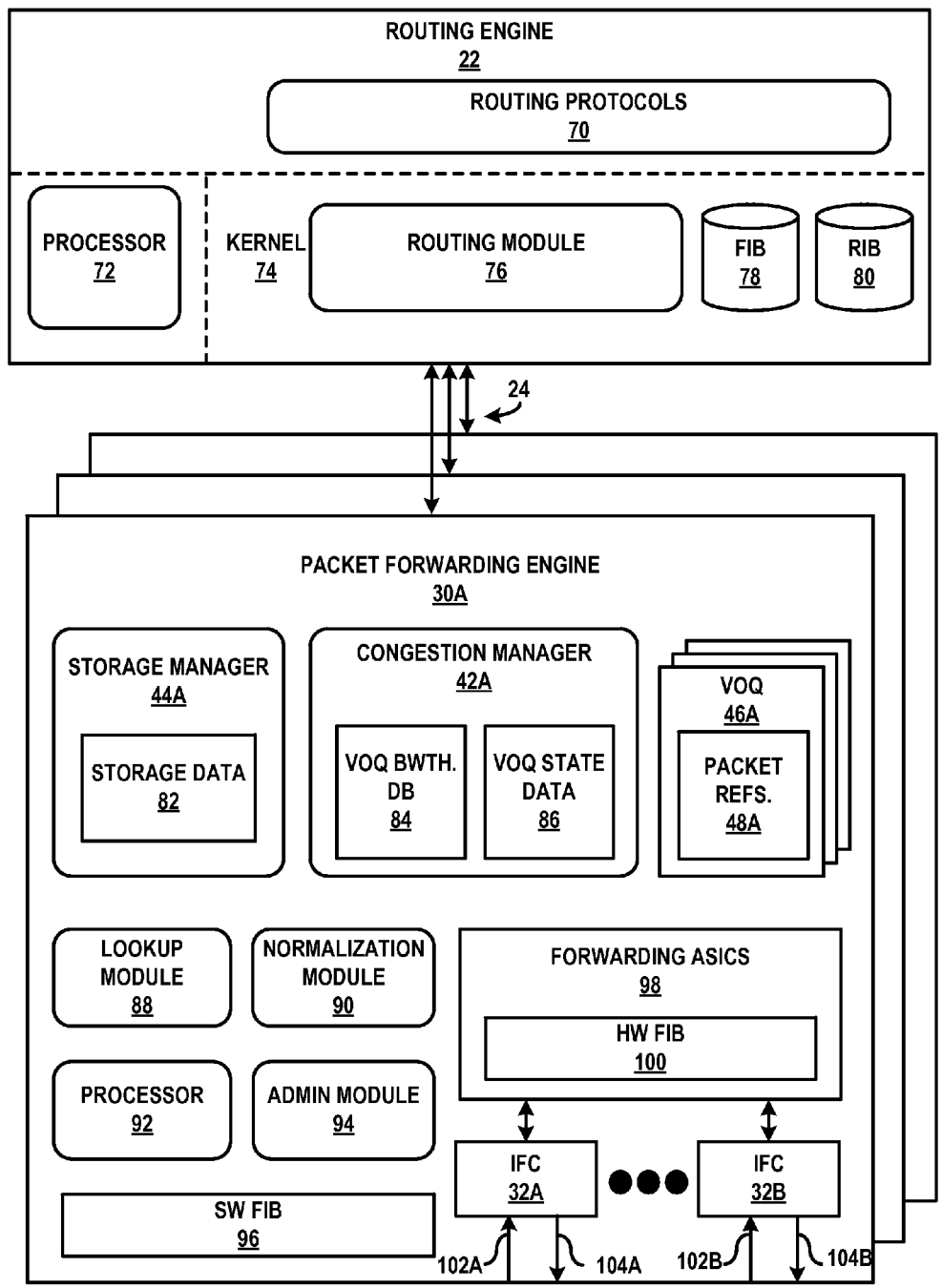
FIG. 4 is a block diagram illustrating in further detail a routing engine and ingress forwarding unit of a router operating in accordance with techniques of the present disclosure.

Ingress PFE 30A also include CM 42A. CM 42A evaluates the congestion state of VOQs of ingress PFE 30, such as VOQ 46A, and determines whether to dynamically modify the buffer sizes of the respective queues in response to changes in the drain rates of the VOQs. CM 42A is also responsible for selectively dropping or marking packets received at ingress PFE 30A. In accordance with techniques of the disclosure, a lookup module (as shown in FIG. 4) of ingress PFE 40A initially receives network packet 40 via an ingress interface. In response to receiving network packet 40, the lookup module performs an ingress lookup based on keying information of the network packet to determine a forwarding next hop for the network packet. The lookup module determines, for example, that the forwarding next hop for network packet 40 is the egress interface of egress PFE 30N that is associated with output queue 52.

The lookup module of ingress PFE 30A determines from forwarding information of ingress PFE 30A that VOQ 46A is associated with output queue 52. Consequently, the lookup module sends a VOQ identifier of VOQ 46A to CM 42A. In response to receiving the VOQ identifier, CM 42A determines VOQ state data associated with VOQ 46A. In some examples, CM 42A manages VOQ state data for each VOQ, such as VOQ 46A, included in ingress PFE 30. VOQ state data for VOQ 46A may include the current VOQ buffer size of VOQ 46A. VOQ state data for VOQ 46A may also include a VOQ sample drain rate, which indicates a sample drain rate determine in a recent period of time, e.g., 15 milliseconds. The VOQ state data may also include a time averaged drain rate of the VOQ 46A that is based on multiple drain rate samples averaged over a period of time. The VOQ state data managed by CM 42A also includes one or more profiles associated with each VOQ of ingress PFE 30A, such as VOQ 46A. As further described in FIG. 5, a profile may be user-configurable based on one or more of port rate specified by the user for output queue 52 corresponding to the egress interface, a buffer size specified by the user for output queue 52 corresponding to the egress interface, drop precedence for network packets specified by the user, etc. A profile may also include default values for each of the user-configurable settings.

CM 42A also includes a VOQ bandwidth database. The VOQ bandwidth database may indicate one or more minimum and maximum VOQ buffer size threshold pairs for various different drain rates. Consequently, a bandwidth database may include multiple minimum/maximum threshold pairs, and each minimum/maximum threshold pair may be indexed by a different drain rate.

In the current example, when CM 42A receives the VOQ identifier of VOQ 46A in response to ingress PFE 30A receiving packet 40, CM 42A determines the current buffer size of VOQ 46A from the VOQ state data. Furthermore, CM 42A determines the time averaged drain rate of VOQ 46A included in the VOQ state data associated with VOQ 46A. CM 42A may also determine a profile associated with VOQ 46A from the profile information managed by CM 42A. Using the time averaged drain rate for VOQ 46A, CM 42A determines the minimum/maximum threshold pair of the VOQ bandwidth database that corresponds to the drain rate. CM 42A then determines whether the VOQ buffer size of VOQ 46A is within the minimum and maximum thresholds of the minimum/maximum threshold pair if network packet 40 is enqueued in VOQ 46A. In some examples, CM 42A determines the size of network packet 40 to determine whether the buffer size of VOQ 46A would exceed the maximum threshold.

If CM 42 determines that the current VOQ buffer size is greater than or equal to the maximum threshold, CM 42A, in the example of FIG. 3, drops the network packet. In other examples, CM 42A may perform one or more other operations other than or in addition to dropping the network packet.

In the current example, CM 42 determines that the VOQ buffer size of VOQ 46A is less than the maximum threshold. In the example of FIG. 3, CM 42 enqueues network packet 40 in response to determining the VOQ buffer size of VOQ 46A is less than the maximum threshold. In other examples, CM 42, in response to determining the VOQ buffer size is less than the maximum threshold, may use one or more congestion avoidance techniques to determine whether to drop or enqueue network packet 40. Example congestion avoidance techniques may include, for example, Weighted Random Early Detection (WRED), Random Early Detection (RED), Weighted Tail Drop, etc. The use of such congestion avoidance techniques when the VOQ buffer size is less than the maximum threshold is further described in FIG. 5 of the disclosure.

To enqueue network packet 40 in VOQ 46A, CM 42 sends an enqueue message to storage manager 44A that indicates VOQ 46A and network packet 40. Storage manager 44A receives the message and determines the size pages in DRAM 50A that are allocated to VOQ 46A. If a page allocated to VOQ 46A is only partially full and the size of network packet 40 is less than or equal to the remaining free space of the page, storage manager 44A stores network packet 40 in the partially full page. If however, the size of network packet 40 is greater than the remaining free space of the page, storage manager 44A allocates a new page of memory in DRAM 40A to VOQ 46A and stores network packet 40 in the page. In addition, storage manager 44A stores a pointer in packet references 48A to the memory address of the page in DRAM 50A that includes network packet 40.

In the example of FIG. 3, storage manager 44A sends a request message to egress PFE 30N to forward network packet 40 of VOQ 46A to egress PFE 30N. Scheduler 50, in response to determining that output queue 52 includes free space to store network packet 40, sends a grant message that permit ingress PFE 30A to dequeue network packet 40 from VOQ 46A and forward network packet 40 to egress PFE 30N. Egress PFE 30N receives and stores network packet 40 at output queue 52 until egress PFE 30N forwards network packet 40 to another network device. Upon dequeueing and forwarding network packet 40, storage manager 44A removes the pointer to network packet 40 from packet references 48A and deallocates the memory of DRAM 50A that previously stored network packet 40.

As previously described in the example of FIG. 3, ingress PFE 30A may initially be the only source of network packets received at egress PFE 30N. However, ingress PFE 30B, also implementing techniques of the disclosure described previously with respect to ingress PFE 30, may also begin forwarding network packets to egress PFE 30N. Consequently, if scheduler 50 implements round robin scheduling as one example, the bandwidth available to ingress PFE 30A to send network packets to egress PFE 30N decreases as ingress PFE 30B begins sending network packets. Thus, the increase of network packets from ingress PFE 30B may increase the congestion at egress PFE 30N as egress PFE 30N receives network packets from multiple ingress PFEs 30A, 30B.

When ingress PFE 30A receives network packets while ingress PFE 30B also forwards network packets, CM 42A determines a decreasing time averaged drain rate of VOQ 46A due to the increasing congestion at egress PFE 30N. CM 42A updates VOQ state data for VOQ 46A as network packets are received at ingress PFE 30A and enqueued in VOQ 46A. As the time averaged drain rate of VOQ 46A decreases, CM 42A may determine a different minimum/maximum threshold pair that corresponds to the decreased time averaged drain rate. For instance, the maximum value of the threshold pair for the decreased time averaged drain rate may be less than the maximum value of the threshold pair for the previously determined time averaged drain rate when only ingress PFE 30A was forwarding network packets to egress PFE 30N. CM 42A may determine that the buffer size of VOQ 46A is now larger than the maximum threshold that corresponds to the decreased time averaged drain rate. Consequently, CM 42A will drop network packets received at ingress PFE 30A and forward existing network packets on VOQ 46A until the buffer size of VOQ 46A is less than or equal to the maximum threshold size of VOQ 46A. In this way, CM 42A dynamically decreases the buffer size of VOQ 46A in response to determining the decreasing drain rate of VOQ 46A.

FIG. 4 is a block diagram illustrating in further detail routing engine 22 and ingress packet-forwarding engine 30A of router 6 as shown in FIGS. 2 and 3, in accordance with techniques of the present disclosure. Routing engine 22 may include various routing protocols 70, such as Multiprotocol Label Switching (MPLS), Resource Reservation Protocol (RSVP), Border Gateway Protocol (BGP), etc. Routing protocols 70 interact with kernel 74 (e.g., by way of API calls) to update routing information base (RIB) 80 based on routing protocol messages received by routing engine 22. For instance, kernel 74, executing at processor 72, generates forwarding information in the form of forwarding information base (FIB) 78 based on the network topology represented in RIB 80. Routing module 76 may determine the physical interface allocated to ingress PFE 30A to be used for forwarding next hops that are included in the forwarding information. Routing module 76 then programs PFE 30A to install copies of the FIB 78 as software FIB 96 of ingress PFE 30A. Processor 72, in some examples, includes a CPU and/or memory and can provide processing resources for one or more components including kernel 74, routing module 76, FIB 78, RIB 80, etc.

Processor 92 of ingress PFE 30A, in some examples, includes a CPU and/or memory and can provide processing resources for one or more components of ingress PFE 38A including storage manager 44A, congestion manager 42A, lookup module 88, normalization module 90, administrator module 94, forwarding ASICs 90, etc. Processor 92 may execute a microkernel to provide an operating environment for one or more interfaces between components.

FIG. 4 also depicts example embodiments of ingress PFE 30A in further detail. PFE 30A includes storage manager 44A as shown in FIG. 3. Storage manager 44A manages storage data 82. In some examples, storage data 82 includes one or more data structures to manage pages of DRAM 50A that are allocated to VOQ 46A and other VOQs of ingress PFE 30A. In some examples, storage data 82 includes a linked list of pointers that reference pages of DRAM 50A that are allocated to VOQ 46A. To increase the size of VOQ 46A, storage manager 44A adds a pointer to an unallocated page of DRAM 50A to the linked list. Conversely, to decrease the size of VOQ 46A, storage manager 44A removes a pointer to an allocated page of DRAM 50A from the linked list.

CM 42A in some examples, includes VOQ bandwidth database 84 and VOQ state data 86. As previously described in FIG. 3, VOQ bandwidth database 84 includes one or more maximum and minimum buffer size threshold pairs. In some examples, each threshold pair may be referenced by an index value that comprises a drain rate of a VOQ. In some examples the drain rate may be a time averaged drain rate of VOQ. As is further described in FIG. 5, each threshold pair may be referenced by an index value that comprises a drain rate and, in some examples, one or more parameters of profile information, such as a user-specified buffer size parameter of output queue 52. In such examples, the time averaged drain rate and the parameters of the profile information together comprise an index value that is associated with a minimum/maximum threshold pair in VOQ bandwidth database 84.

Figure 5:
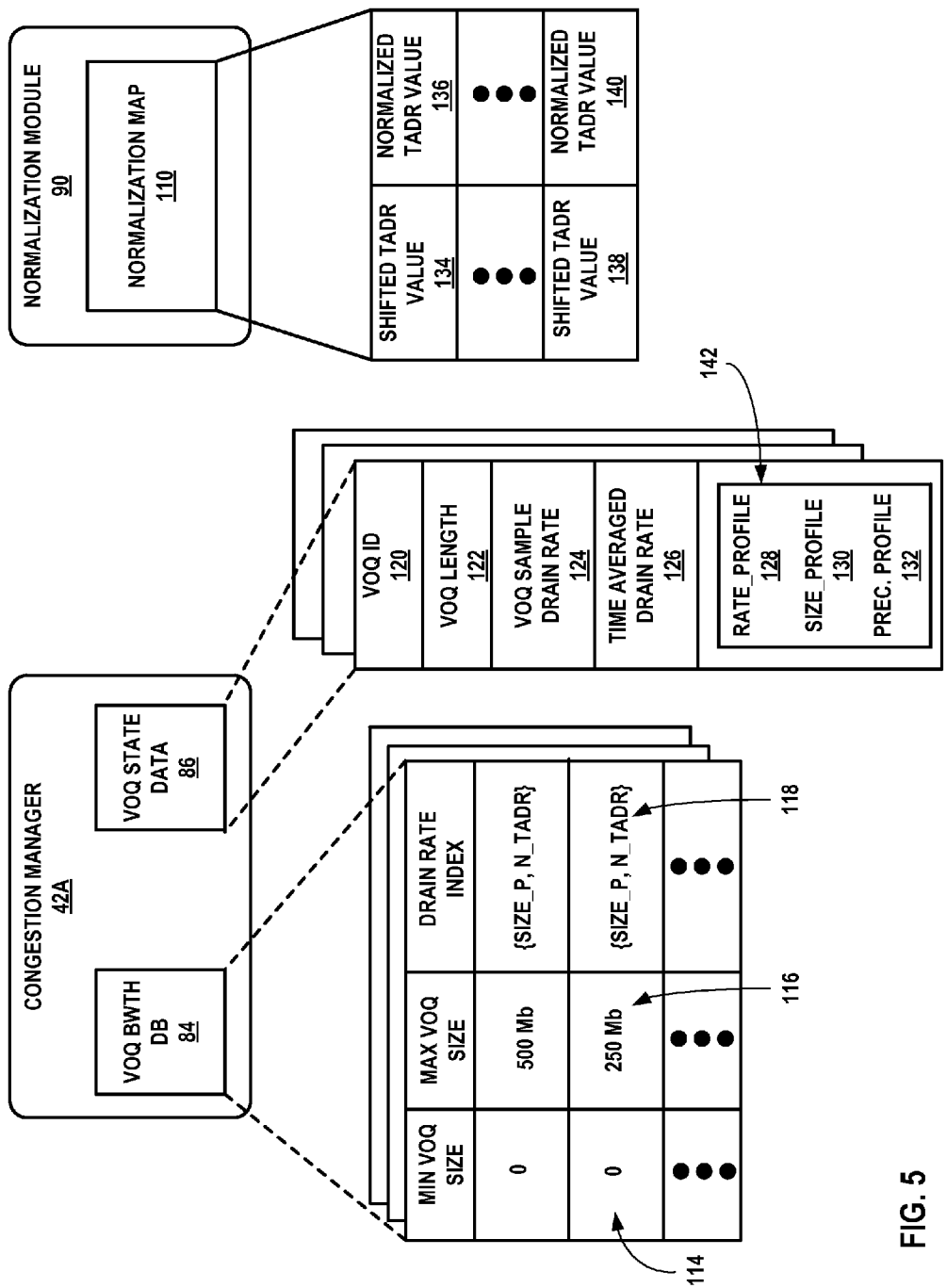
FIG. 5 is a block diagram that illustrates further details of congestion manager and normalization module of an ingress forwarding unit operating in accordance with techniques of the present disclosure.

CM 42A also includes VOQ state data 86 as previously described in FIG. 3 and further described in FIG. 5. Examples of VOQ state data 86 include VOQ identifier, VOQ size, VOQ sample drain rate, time averaged drain rage. Other examples of VOQ state data 86 include an ingress port rate parameter, a buffer size parameter, and a drop precedence parameter. CM 42A periodically updates VOQ state data 86 as network packets are processed by CM 42A. For instance, CM 42A may include multiple separate processes to update different VOQ state data. As one example, CM 42A may include a process that determines a sample drain rate of VOQ 46A every 15 milliseconds or other suitable time period. Upon determining the sample drain rate, CM 42A updates the sample drain rate value for VOQ 46A in VOQ state data 86.

CM 42A may also include a separate process that determines a time averaged drain rate for VOQ 46A. The time averaged drain rate (TADR) may be an exponential weighted moving average (EWMA). This averaging is a low pass filter function whose time constant is determined by $W_{bw}$. $W_{bw}$ is a weighting factor for the actual drain rate. In one example, TADR may be determined as:

$$TADR = (1 - W_{bw}) * \text{Old\_TADR} + W_{bw} * Q_{drain}$$
$$= \text{Old\_TADR} - (\text{Old\_TADR} >> N) + (Q_{drain} >> N)$$

In the example TADR calculation above, $W_{bw}=2^{-N}$, where N is a TADR average constant. $Q_{drain}$ is number of entities (pages) that left VOQ 46A since last computation of TADR. That is, in some examples, $Q_{drain}$ is the most recently determined VOQ sample drain rate stored in VOQ state data 86 for VOQ 46A. Old_TADR is the previously determined TADR value before CM 42A determines an updated TADR value. CM 42A may also include a separate process that updates the buffer size of VOQ 46A in VOQ state data 86 as network packets are enqueued and dequeued in VOQ 46A. In this way, VOQ state data 86 is maintained and updated.

As shown in FIG. 4, ingress PFE 30A also includes lookup module 88. Lookup module 88, in some examples, receives forwarding information of FIB 78 from routing engine 22 and stores the forwarding information in software FIB 96. Lookup module 88, in some examples, configures hardware FIB 100 of forwarding ASICs 98 to process network packets in accordance with the forwarding information of software FIG. 96.

Hardware FIB 100 may include one or more lookup structures. Lookup structures can include associations between network prefixes, network routes, next hops, etc. For instance, an example of a lookup structure may include a radix tree. The radix tree may include hierarchically arranged nodes that correspond to keying information of a network packet, such as a network address, interface identifier, etc. In some examples, a leaf node of the radix tree is associated with a next hop, group of chained next hops, interface identifier, etc. Consequently, when ingress PFE 30A receives a network packet, forwarding ASICS 98 can use keying information (e.g., source network address, destination network address, protocol, source interface, destination) associated with the network packet to traverse the radix tree and select a next hop that corresponds to the keying information. Forwarding ASICs 100 may then process the network packet in accordance with the next hop.

As shown in FIG. 4, PFE 38A includes ASICs 98. ASICs 98 are microcode-controlled chipsets that are programmably configurable by processor 92 in accordance with hardware FIB 100. Specifically, one or more of ASICs 98 are controllable by microcode programmed by processor 92. One example of a network device including a packet processing engine having multiple microcode instruction memories is described in U.S. Pat. No. 6,976,154, issued Dec. 13, 2005, the entire contents of which are incorporated herein by reference. Processor 92 programs a hardware FIB 100 into internal memory of ASICs 98 based on software FIB 96.

PFE 30A also includes normalization module 90. In some examples, a user may configure output queue 52 to use less than the full buffer size and/or port rate of the egress interface to which output queue 52 is associated. Because a user can use profiles to configure port rates and buffer sizes for output queues over a wide range, the drain rates of VOQs may vary over a wide range. Normalization module 90 normalizes the respective drain rates of VOQs for each ingress PFE based at least in part on one or more of user specified buffer size and/or port rate. Consequently, CM 42A can use a normalized drain rate as an index value when determining a corresponding maximum/minimum buffer size threshold pair in VOQ bandwidth database 84. In this way, normalization module 90 provides techniques that enable CM 42A to use VOQ bandwidth database in accordance with techniques of the present disclosure with ingress PFEs having varying port rates. Further details of normalization module 90 are described in FIG. 5.

Ingress PFE 30A also includes administration module 94. In some examples, administration module 94 generates information to provide an interface that enables a user to specify one or more user configured parameters of a profile. For instance administration module 96 can provide a graphical user interface that allows a user to specify one or more parameters of a profile. Example parameters may include ingress PFE port rate, VOQ buffer size, and drop precedence.

In accordance with techniques of the disclosure, ingress PFE 30A receives at network packet at ingress interface 32A via link 102A. As shown in FIG. 4, links 102A-102B and 104A-104B may be wired or wireless links to other network devices operatively coupled to router 6. Upon receiving the network packet, forwarding ASICs 98 determine a forwarding next hop in hardware FIG. 100 based on keying information of the network packet. Forwarding ASICs 98 determine that the forwarding next hop for the network packet is an egress interface of egress PFE 30N. Output queue 52 may be associated with the egress interface of egress PFE 30N.

Forwarding ASICs 98 determine that VOQ 46A is associated with output queue 52 and therefore send a VOQ identifier of VOQ 46A to CM 42A. Upon receiving the VOQ identifier, CM 42A determines VOQ state data 86 of VOQ 46A using the VOQ identifier. In some examples, CM 42A determines the buffer size of VOQ 46A and the time averaged drain rate of VOQ 46A that are each included in VOQ state data 86.

Using the time averaged drain rate of VOQ 46A as an index value, CM 42A determines a minimum/maximum buffer size threshold pair in VOQ bandwidth database 84 associated with the time averaged drain rate. CM 42A determines enqueueing the network packet at VOQ 46A could cause the buffer size of VOQ 46A to exceed the maximum buffer size threshold. If the maximum buffer size threshold would be exceeded, CM 42A drops the network packet. Alternatively, if CM 42A determines that enqueueing the network packet would not exceed the maximum buffer size threshold, CM 42A may enqueue the network packet at VOQ 46A.

To enqueue the network packet, CM 42A sends an enqueue request to storage manager 44A that indicates the network packet and the VOQ identifier. Storage manager 44A uses the VOQ identifier to selected the linked list of pages of memory in storage data 82 that correspond to the VOQ identifier. Storage manager 44A stores the network packet in a page of memory and updates the corresponding link list of storage data 82. In addition, storage manager 44A adds a pointer to the network packet in packet references 48A of VOQ 46A. In some examples, storage manager 44A further sends a request to egress PFE 30N to send the network packet to egress PFE 30N.

In accordance with techniques of the disclosure, ingress PFE 30A may initially be the only source of network packets forwarded to egress PFE 30N. CM 42A may therefore initially configure the buffer size of VOQ 46A to be equal to the logical size of output queue 52 of egress PFE 30N. At a later time, ingress PFE 30B may also begin forwarding network packets to egress PFE 30N. As a result, the bandwidth available to ingress PFE 30A to forward network packets to output queue 52 decreases. Consequently, the time averaged drain rate of VOQ 46A decreases over time and CM 42A updates VOQ state data 86 accordingly.

When ingress PFE 30A later receives a network packet destined for output queue 52 after ingress PFE 30B has begun sending network packets to output queue 52, CM 42A again determines VOQ state data 86 associated with VOQ 46A. CM 42A determines the size of VOQ 46A and also the time averaged drain rate for VOQ 46A. CM 42A uses the time averaged drain rate for VOQ 46A to determine a minimum and maximum buffer size threshold pair in VOQ bandwidth database 84. The threshold pair using the current time averaged drain rate may be different than the threshold pair that corresponded to the previous time averaged drain rate before ingress PFE 30B began sending network packets. For example, the threshold pair using the current time averaged drain rate may include a lower maximum buffer size threshold. CM 42A may therefore compare the buffer size of VOQ 46A to the maximum threshold value for the current time averaged drain rate and determine that the buffer size of VOQ 46A is greater than the maximum threshold value.

Because CM 42A determines that the buffer size of VOQ 46A is greater than the maximum threshold, CM 42A may drop the network packet. CM 42A may drop subsequent network packets until the size of VOQ 46A decreases below the maximum threshold for the time averaged drain rate associated with VOQ 46A. That is, the size of VOQ 46A decreases as storage manager 44A dequeues and forwards network packets to VOQ 46A while CM 42A drops networks packets. Once the size of VOQ 46A is less than or equal to the maximum threshold buffer size associated with the time averaged drain rate for VOQ 46A, CM 42A may stop dropping network packets destined for output queue 52 and instead enqueue the network packets in VOQ 46A.

Ingress PFE 30B may subsequently stop forwarding network packets to egress PFE 30N. As a result, the bandwidth available to ingress PFE 30A to forward network packets to output queue 52 increases. Consequently, the time averaged drain rate of VOQ 46A increases over time and CM 42A updates VOQ state data 86 accordingly.

When ingress PFE 30A later receives a network packet destined for output queue 52, CM 42A again determines VOQ state data 86 associated with VOQ 46A. CM 42A determines the size of VOQ 46A and also the time averaged drain rate for VOQ 46A. CM 42A uses the time averaged drain rate for VOQ 46A to determine a minimum and maximum buffer size threshold pair in VOQ bandwidth database 84. Because the time averaged drain rate of VOQ 46A increases, the maximum buffer size threshold increases as well. However, CM 42A may continue to drop subsequent network packets until the size of VOQ 46A decreases below the maximum threshold for the new time averaged drain rate. Once the size of VOQ 46A is less than or equal to the maximum threshold buffer size associated with the time averaged drain rate for VOQ 46A, CM 42A may stop dropping network packets destined for output queue 52 and instead enqueue the network packets in VOQ 46A.

FIG. 5 is a block diagram that illustrates further details of congestion manager 42A and normalization module 90 as previously described in FIGS. 3-4. As shown in FIG. 5, CM 42A includes VOQ bandwidth database 84 and VOQ state data 86. Normalization module 90 includes normalization map 110.

As shown in FIG. 5, VOQ state data 86 includes: VOQ identifier 120, VOQ length 122, VOQ sample drain rate 124, time averaged drain rate 126, and profile information 142. Profile information 142 further includes a rate profile 128, size profile, 130, and drop precedence 132. In some examples, VOQ identifier 120 is a unique identifier to identify VOQ 46A. VOQ identifiers can uniquely identify multiple, different VOQs of ingress PFE 30A. VOQ length 122 is a value that represents to the current size of VOQ 46A. VOQ sample drain rate 124 indicates a sampled drain rate at a point in time. For instance VOQ sample drain rate 124 may be a drain rate of VOQ 46A determined by CM 42A that is determined every 15 milliseconds. CM 42A may use any suitable sampling interval. As described in FIG. 4, time averaged drain rate (TADR) 126 is the time average drain rate of VOQ 46A. That is, TADR 126 represents the average of multiple VOQ sample drain rates over a period of time.

As shown in FIG. 5, profile information 142 includes a rate profile 128. Rate profile 128 indicates a portion of the total port rate of an egress interface that is allocated to output queue 52. That is, a user may specify a bandwidth, in absolute or percentage value, of output queue 52 that is equal to some portion or all of the total bandwidth for the egress interface that corresponds to output queue 52. In some examples, CM 42A enables the user to select from multiple different rate profiles. For instance, CM 42A may generate 64 different profiles for a range of output queue bandwidths that correspond to maximum and minimum possible port rates all the egress PFEs that can receive network packets from ingress PFEs 30A and 30B. For instance CM 42A may determine a range of 100 Mb/s (Mbps) to 100 Gbps if the maximum port rate of any egress interface is 100 Gbps while a minimum port rate of any egress PFE is Gbps In one example, CM 42A may divide the 100 Mbps to 100 Gbps total port rate into 64 profiles and assign a unique identifier to each profile. Each profile may include a subset of the entire range of 100 Mbps to 100 Gbps. Each VOQ, such as VOQ 46A, may be assigned a rate profile by a user. For instance, the egress interface of egress PFE 30N may have a maximum port rate of 100 Gbps. A user, however, may choose to configure output queue 52 to use 40% of the 100 Gbps port rate (e.g., 40 Gbps). Consequently, CM 42A determines profile identifier of the profile having a range that includes 40 Gbps and stores a profile identifier of the rate profile as rate profile 128. As is further described below, CM 42A and normalization module 90 may use rate profile 128 to normalize time averaged drain rates for different egress interface port rates. In this way, CM 42A can use normalized time averaged drain rates as index values into VOQ bandwidth database 84 to determine minimum and maximum buffer size thresholds.

Profile information 142 also includes size profile 130. Size profile 130 indicates a portion of the total buffer size of the egress interface that corresponds to output queue 52. The portion of the total buffer size is allocated to output queue 52. Like rate profile 128, a user may specify a buffer size, in absolute or percentage value, of output queue 52 that is equal some portion or all of the total buffer space for the egress interface that corresponds to output queue 52. In some examples, CM 42A enables the user to select from multiple different size profiles. For instance, CM 42A may generate 64 different profiles for a range of output queue buffer sizes that correspond to maximum and minimum possible buffer sizes all the egress PFEs that can receive network packets from ingress PFEs 30A and 30B. For instance CM 42A may determine a buffer size range of 100 megabits to 500 megabits if the maximum buffer size of any egress interface is 500 megabits while a minimum port rate of any egress PFE is 100 Mbps. In one example, CM 42A may divide the 100 megabits to 500 megabits total buffer size range into 64 profiles and assign a unique identifier to each profile. Each profile may include a subset of the entire range of 100 megabits to 500 megabits. Each VOQ, such as VOQ 46A, may be assigned a size profile by a user. For instance, the egress interface of egress PFE 30N may have a maximum port rate of 500 Mbps. A user, however, may choose to configure output queue 52 to use 50% of the 500 megabit buffer size. Consequently, CM 42A determines profile identifier of the profile having a range that includes 250 megabits and stores a profile identifier of the size profile as size profile 130. As is further described below, CM 42A uses size profile 130 and a normalized time averaged drain rate value as a combined index value to determine a minimum/maximum buffer size threshold pair in VOQ bandwidth database 84. In this way, CM 42A can use normalized time averaged drain rates and the size profile as index values into VOQ bandwidth database 84 to determine minimum and maximum buffer size thresholds.

In some examples, rate information 142 also includes a drop precedence profile 132. Drop precedence profile 132 may be an identifier that specifies one or more operations to process a network packet using congestion avoidance techniques. For instance, a drop precedence profile may specify one or more congestion avoidance techniques that include, for example, Weighted Random Early Detection (WRED), Random Early Detection (RED), Weighted Tail Drop, etc. Drop congestion techniques provide for handling multiple classes of traffic by selectively discarding lower priority traffic when the network begins to experience congestion. In one example, Explicit Congestion Notification (ECN) marks packets instead of dropping them when congestion is detected. Sources of network packets may use packet marking or drop as a signal that the network is congested and slow down sending packets. To use a drop precedence profile, when CM 42A determines, for example, that VOQ length 122 is less than a maximum buffer size threshold, CM 42A may further determine drop precedence profile 132 associated with VOQ 46A. By processing the network packet in accordance with drop precedence profile 132, CM 42A can determine whether to enqueue the network packet, drop the network packet, mark the packet, etc.

CM 42A may provide multiple different precedence profiles. In a "probabilistic drop precedence profile," CM 42A selectively drops network packets upon detection of congestion based at least in part on a probabilistic model. Using such techniques, CM 42A can avoid global synchronization, i.e., prevent the packet sender from reducing its transmission rate at the same time when packet loss occurs. In a probabilistic drop precedence profile, CM 42A may use one or more WRED probability curves that specify drop decisions. The drop decision may be based on probabilities of congestion at egress PFE 30 for various queue lengths, which are themselves based on respective VOQ enqueue and drain rates.

In an "unconditional drop precedence profile" CM 42A unconditionally drop network packets upon determining that the buffer size of the VOQ exceeds the maximum buffer size threshold for the drain rate of the VOQ. In contrast, in a "do not drop precedence profile" CM 42A unconditionally enqueues network packets. In a "mark precedence profile," packets are selectively marked when CM 42A determines, based on one or more probabilistic models, that congestion is present at egress PFE 30N. If CM 42A further determines, based on the one or more probabilistic models, that the severity of the congestion is increasing, CM 42A can selectively drop marked packets, e.g., based on a type of mark applied to the network packet. For example, CM 42A may include a hierarchy of mark types that indicate varying priority levels. Packets marked with lower priority mark types may be dropped in response to congestion before packets marked with higher priority mark types.

FIG. 5 also illustrates VOQ bandwidth database 84 in further detail. As shown in FIG. 5, VOQ bandwidth database 84 includes minimum and maximum buffer size threshold pairs that are indexed, respectively, by index values that each comprises a size profile and a normalized time averaged drain rate. As one example, minimum buffer size threshold 114 and maximum buffer size threshold 115 comprise a buffer size threshold pair that is indexed by index value 118. Index value 118 comprises a size profile and a normalized time averaged drain rate.

As shown in FIG. 5, normalization module 90 includes normalization map 110. Normalization map 110 includes mappings between shifted time averaged drain rate values and normalized time averaged drain rate values. As described in FIG. 4, CM 42A calculates TADR 126 with an averaging function that takes into account the current drain rate (i.e., VOQ sample drain rate 124), the number of pages drained in a configurable time period, and a weighting factor (or averaging constant). TADR 126, in the example of FIG. 5 is a 13-bit value that provides a measure of the drain rate for VOQ 46A. Depending on rate profile 128, only certain bits of the 13-bit TADR 126 value may be significant for selecting a maximum and minimum buffer size threshold pair in VOQ bandwidth database 84. For example, a group of lower bits of TADR 126 may be significant for a rate profile that uses a small percentage of the total port rate of the egress interface for output queue 52. In another example, a group of upper bits of TADR 126 may be significant for a rate profile that uses a large percentage of the total port rate of the egress interface for output queue 52.

Normalization module 90 uses normalization table 110 to convert TADR 126 into a normalized TADR value that CM 42A can use as an index value to determine a minimum and maximum buffer size threshold pair. By using normalized TADR values, VOQs associated with output queues having different user configurations (e.g., based on different profile information) can be managed by CM 42A using the same VOQ bandwidth database 84. In this way, techniques of the disclosure can save storage space by using a single VOQ bandwidth database for any number of VOQs associated with output queues having different, independent user configurations.

Normalization module 90 provides techniques that enable CM 42A to determine a buffer size threshold pair in VOQ database 84 for various VOQs with different rate profiles for a given size profile and vice versa. That is, given a size profile and normalized TADR value, CM 42A can determine a buffer size threshold pair in VOQ database 84 for a VOQ having any rate profile. While normalization map 110 is now described as data structure generated by normalization module 90 for purposes of illustration, in some examples, normalization module 90 performs one or more operations in accordance with the normalization techniques to generate normalized TADR values without explicitly generating normalization map 110.

When CM 42A initially receive a network packet and determines VOQ state data 86 for VOQ 46A, CM 42A determines, among other VOQ state data, TADR 126 and rate profile 128. CM 42A sends TADR 126 and rate profile 128 to normalization module 90. In some examples, each rate profile specifies a shift value. The shift value specifies which bits of TADR 126 are significant for determining the minimum and maximum buffer size threshold pair in VOQ bandwidth database 84. For example, a shift value may specify a group of lower-ordered bits for a rate profile that uses a small percentage of the total port rate of the egress interface for output queue 52. In another example, a shift value may specify a group of higher ordered bits for a rate profile that uses a greater percentage of the total port rate of the egress interface for output queue 52.

In response to determining the shift value, normalization module 90 may, for example, determine a shifted time averaged drain rate value 134 that comprises a group of bits of TADR 126 that are specified by the shift value. Normalization module 90 performs a lookup on normalization map 110 to determine a normalized TADR value 136 that corresponds to shifted TADR value 134.

CM 42A receives normalized TADR value 136. Using normalized TADR value 136 and size profile 130 collectively as index value 118, CM 42A determines minimum buffer size threshold 114 and maximum buffer size threshold 116. CM 42A can then determine whether enqueuing the received network packet to VOQ 46A causes VOQ length 122 to increase to a size that is greater than maximum buffer size threshold 116. Upon performing this determination, CM 42A can further determine whether to drop and enqueue the packet using one or more congestion avoidance techniques indicated by precedence profile 132. In this way, CM 42A can modify the size of VOQ 46A using normalized TADR 136 and size profile 130, in accordance with techniques of the disclosure.

Figure 6:
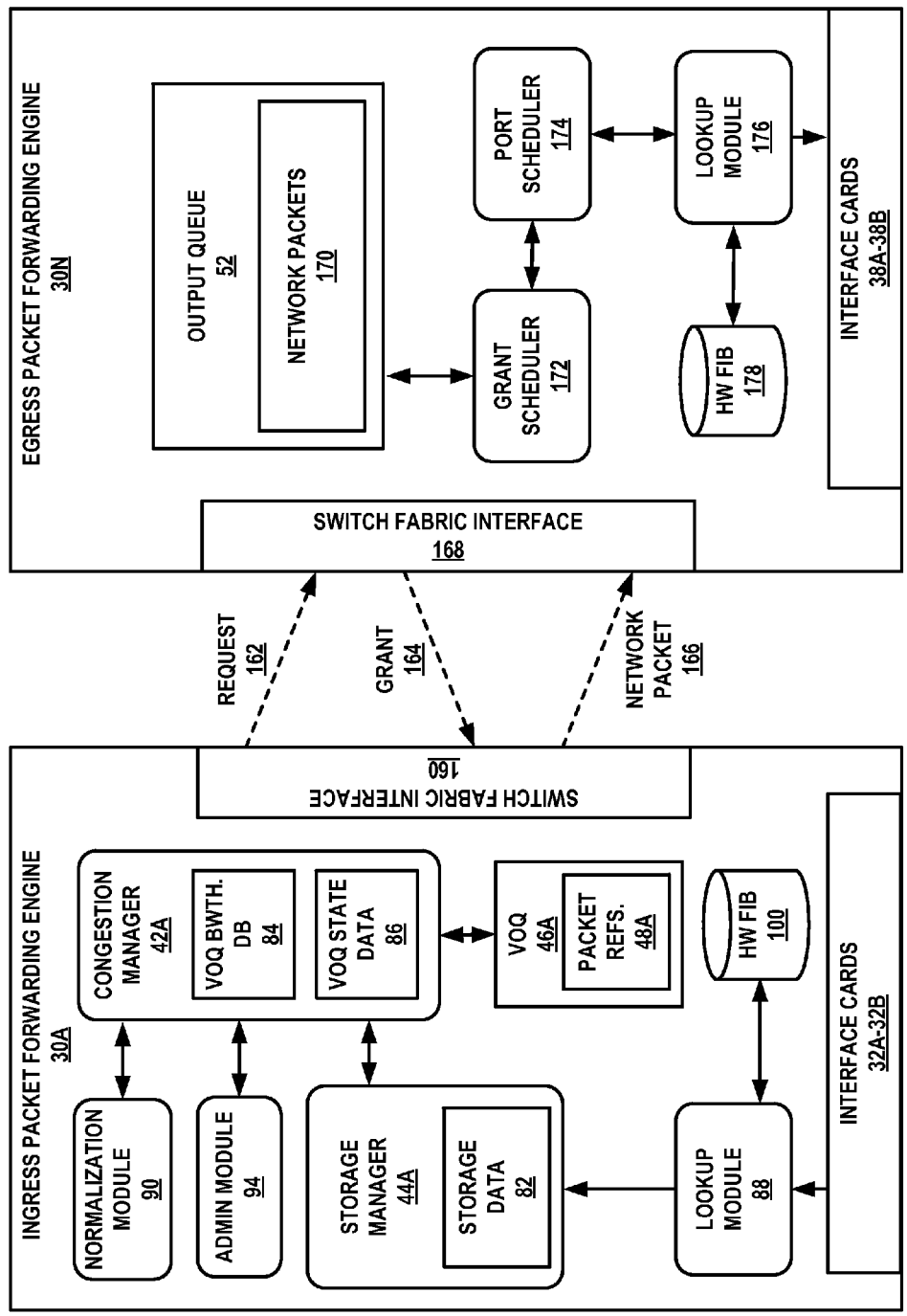
FIG. 6 is a block diagram that illustrates further details of an ingress forwarding unit operating in accordance with techniques of the present disclosure.

FIG. 6 is a block diagram that illustrates further details of ingress PFE 30A and egress PFE 30N of FIGS. 2-4, in accordance with techniques of the present disclosure. As shown in FIG. 6, ingress PFE 30A includes normalization module 90 administrator module 94, storage manager 44A, lookup module 88, congestion manager (CM) 36A, VOQ 46A, hardware FIB 100, switch fabric interface 160, and interface cards 32A-32B. Storage manager 44A includes storage data 82. CM 42A includes VOQ bandwidth database 84 and VOQ state data 86. Storage manager 44A includes storage data 82. VOQ 46A includes packet references 48A.

Egress PFE 30N includes output queue 52, which further include network packets 170. Egress PFE 30N also includes switch fabric interface 168, grant scheduler 172, port scheduler 174, lookup module 176, hardware FIB 178, and interface cards 38A-38B. Output queue 52 includes network packets 170. In some examples, switch fabric interface 160 provides an interface to switch fabric 26 that allows PFE 30A to exchange commands and data with other PFEs 30, such as egress PFE 30N on router 6. Similarly, switch fabric interface 168 provides an interface to switch fabric 26 that allows PFE 30N to exchange commands and data with other PFEs 30, such as egress PFE 30A on router 6.

FIG. 6 illustrates a grant-request scheduling techniques used by ingress PFE 30A and egress PFE 30N to forward network packets, in accordance with techniques of the present disclosure. As described in previous examples, storage manager 44A, upon enqueueing a network packet, further sends a request 162 to egress PFE 30N via switch fabric interface 160. In the example of FIG. 6, request 162 may include information specifying, for example, the size of the network packet enqueued at VOQ 46A. Furthermore, the request may indicate to egress PFE 30N that ingress PFE 30A is requesting to forward a network packet to egress PFE 30N. In some examples, request 162 includes a size of a memory page that includes one or more packets or portions of packets.

As shown in FIG. 6, grant scheduler 172 manages packet requests from ingress PFEs. Grant scheduler 172 may implement one or more scheduling algorithms such as round robin scheduling to queue network packet requests. In the example of FIG. 6, grant scheduler 172 processes requests from multiple ingress PFEs using equal-sized time slices. When grant scheduler 172 determines that egress PFE 30N has received request message 162 from ingress PFE 30A, grant scheduler 172 queues the request.

In addition to receiving requests from ingress PFEs, grant scheduler 172 further determines from port scheduler 174 whether one or more of network packets 170 can be forwarded via interface cards 38A-38B. Port scheduler 174 schedules network packets 170 to be output at interface cards 38A-38B. Port scheduler 174 can issue credits to grant scheduler 172 that notify grant scheduler 172 when another one of network packets 170 can be forwarded via interface cards 38A-38B.

In the current example, grant scheduler 172 receives a credit from port scheduler 174 that one of network packets 170 can be forwarded using interface cards 38A-38B. Grant scheduler 172, in response to receiving the credit, dequeues one of network packets 170 from output queue 52. Lookup module 176 performs an egress lookup using hardware FIB 178 to determine a forwarding next hop. Lookup module 176 determines that interface card 38A is specified as the forwarding next hop. Egress PFE 30N subsequently forwards the network packet using interface card 38A.

In response to dequeueing the network packet that was previously forwarded by lookup module 176, grant scheduler 172 determines that it may grant the request message 162 from ingress PFE 30A and receive the network packet corresponding to request 162. To grant the request, grant scheduler 172 sends grant message 164 to ingress PFE 30A. Storage manager 44A receives grant message 164 and dequeues the network packet specified by request 162 from VOQ 46A. Storage manager 44A then sends network packet 166 to egress PFE 30N. Upon sending the network packet, storage manager 44A may perform one or more deallocation operations to update storage data 82 as previously described herein to free the pages of memory that previously stored the network packet.

Egress PFE 30N receives the network packet from storage manger 44A and egress PFE 30N queues the network packet at output queue 52. Grant scheduler 172 subsequently waits until it is granted another credit from port scheduler 174 to dequeue one of network packets 170. As previously described, when grant scheduler 172 receives another credit, grant scheduler 172 dequeues another one of network packets 170, which lookup module 176 subsequently forwards. In this way, grant scheduler 172 and port scheduler 174 facilitate the scheduling and processing of network packets at output queue 52.

As shown in FIG. 6, output queue 52 may be implemented in on-chip memory, off-chip memory, or a combination of on-chip and off chip memory. Output queue 52 may store network packets 170 received from ingress PFEs before forwarding the network packets to another network device using interface cards 38A-38B.

Figure 7:
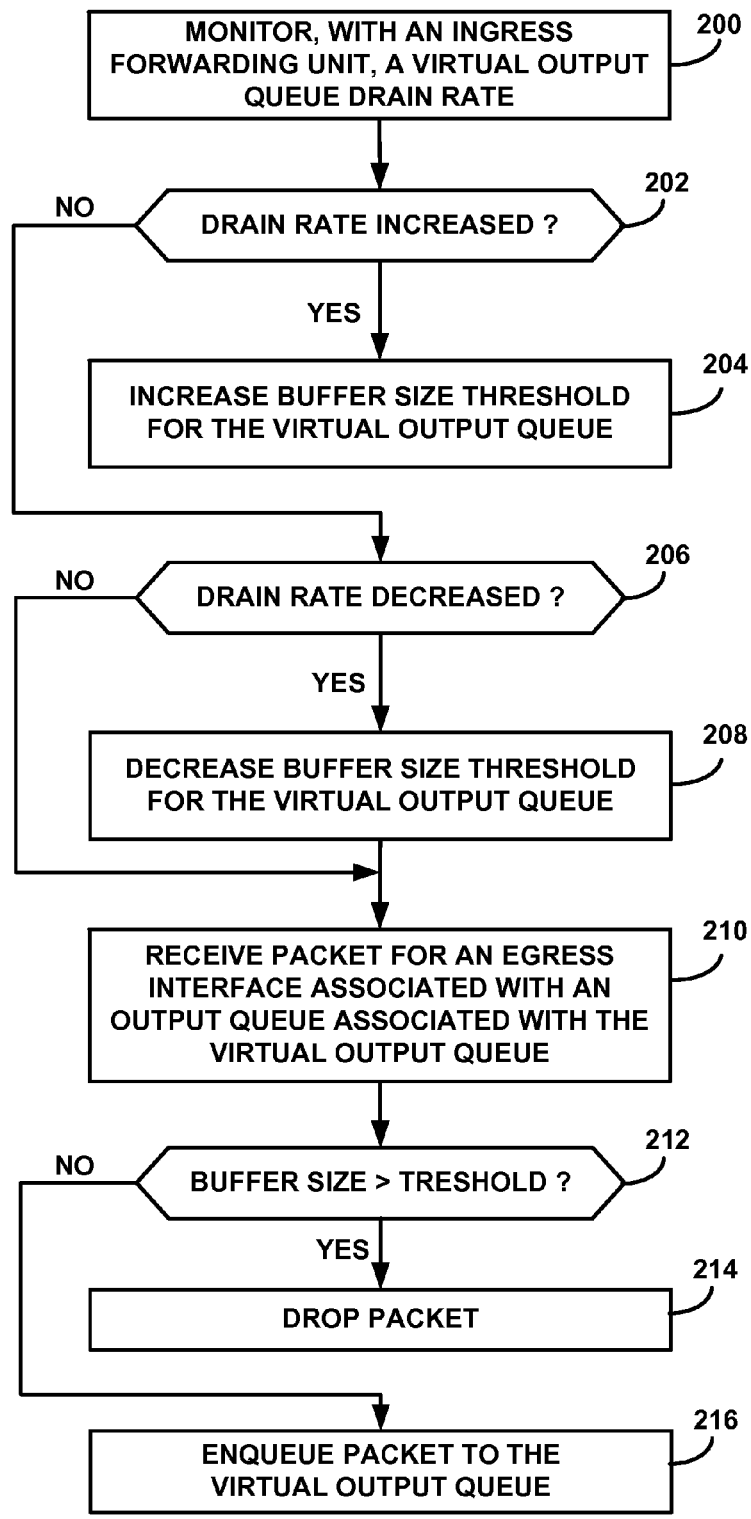
FIG. 7 is a flowchart illustrating an example mode of operation for a forwarding unit of a router operating according to techniques described herein.

FIG. 7 is a flowchart illustrating an example mode of operation for a forwarding unit of a router operating according to techniques described herein. An ingress forwarding unit, such as any of PFEs 30 illustrated and described with respect to FIGS. 2-6, monitors a drain rate of a virtual output queue of the ingress forwarding unit (200). If the drain rate has increased with respect to a previously measured drain rate in excess of a drain rate delta threshold (YES branch of 202), the ingress forwarding unit increases a buffer size threshold for the virtual output queue (204). If, however, the drain rate has decreased with respect to a previously measured drain rate in excess of a drain rate delta threshold (YES branch of 206), the ingress forwarding unit decreases a buffer size threshold for the virtual output queue (208).

After configuring the buffer size threshold for the virtual output queue, the ingress forwarding unit receives a packet for an egress interface that is associated with an output queue corresponding to the virtual output queue (210). That is, the virtual output queue drains to the output queue. As a result, the ingress forwarding unit determines whether enqueuing the packet to the virtual output queue will cause the virtual output queue buffer size to exceed the configured threshold for the buffer size (212). If so (YES branch of 212), ingress forwarding unit drops the packet (214). Otherwise (NO branch of 212), the ingress forwarding unit enqueues the packet to the virtual output queue for eventual forwarding toward the egress interface (216).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
  determining, by a network device, a change in a drain rate at which network packets are forwarded from a Virtual Output Queue (VOQ) of an ingress forwarding unit of the network device to an egress forwarding unit of the network device, wherein the VOQ comprises a logical queue that corresponds to an output queue of the egress forwarding unit, wherein a size of the VOQ comprises a portion of a logical size of the output queue, wherein the logical size of the output queue is divided among a plurality of VOQs of a plurality of respective ingress forwarding units that includes at least the ingress forwarding unit, wherein the drain rate of the VOQ is based on a respective drain rate for each of the VOQs of the plurality of respective ingress forwarding units that is forwarding network packets to the egress forwarding unit; and
  in response to determining the change in the drain rate, modifying, at the ingress forwarding unit, the size of the VOQ in direct proportion to the determined change in the drain rate.

2. The method of claim 1, wherein modifying the size of the VOQ comprises increasing a buffer size of the VOQ when the determined change in the drain rate is an increase in the drain rate.

3. The method of claim 1, further comprising:
  receiving a packet with the ingress forwarding unit;
  determining a forwarding next hop for the packet that corresponds to an egress interface of the egress forwarding unit that is associated with the output queue and the VOQ; and
  dropping the packet if enqueuing the packet to the VOQ would exceed the buffer size of the VOQ.

4. The method of claim 3, further comprising:
  determining the drain rate;
  storing one or more minimum and maximum VOQ buffer size threshold pairs for respective drain rates to a VOQ bandwidth database;
  determining a current buffer size of the VOQ; and
  determining one of the minimum and maximum VOQ buffer size threshold pairs for the drain rate,
  wherein dropping the packet if enqueuing the packet to the VOQ would exceed the buffer size of the VOQ comprises dropping the packet when the buffer size of the VOQ would exceed the maximum VOQ buffer size threshold of the determined minimum and maximum VOQ buffer size threshold pair.

5. The method of claim 1, further comprising:
  determining a logical size of the output queue by computing a product of (1) a delay bandwidth buffer configured for the output queue and (2) an egress interface port rate for an egress interface of the egress forwarding unit that is associated with the output queue; and
  setting an initial size of the VOQ the logical size of the output queue for the VOQ.

6. The method of claim 1, wherein determining a change in the drain rate comprises averaging multiple drain rate samples over a period of time.

7. The method of claim 1, further comprising:
  configuring one of a port rate or a buffer size for an egress interface of the egress forwarding unit that is associated with the output queue; and normalizing respective drain rates for the plurality of VOQs based at least in part on one of the configured port rate or buffer size for the egress interface, wherein modifying the size of the VOQ in direct proportion to the determined change in the drain rate comprises modifying the size of the VOQ in direct proportion to the determined change in the normalized drain rate of the VOQ.

8. The method of claim 1, further comprising:

storing a rate profile for the VOQ that indicates a portion of a total port rate of an egress interface of the egress forwarding unit that is allocated to the output queue and comprises a shift value specifying bits of a time averaged drain rate for the VOQ that are significant;

storing a normalization map comprising one or more entries that each maps a shifted time averaged drain rate value to a normalized time averaged drain rate value;

determining the time averaged drain rate for the VOQ;

shifting the time averaged drain rate by the shift value to compute a shifted time averaged drain rate for the VOQ; and mapping the shifted time averaged drain rate for the VOQ to the normalized time averaged drain rate value using the normalization map, wherein modifying the size of the VOQ in direct proportion to the determined change in the drain rate comprises modifying the size of the VOQ according to the normalized time averaged drain rate value.

9. The method of claim 8, further comprising:

storing a size profile for the VOQ that indicates a size portion of a total buffer size of the egress interface that is allocated to the output queue;

storing one or more minimum and maximum VOQ buffer size threshold pairs for respective time averaged drain rate and size portion pairs to a VOQ bandwidth database;

determining a current buffer size of the VOQ; and determining one of the minimum and maximum VOQ buffer size threshold pairs for the normalized time averaged drain rate value and the size portion, modifying the size of the VOQ according to the normalized time averaged drain rate value comprises setting the size of the VOQ to the maximum VOQ buffer size threshold of the determined minimum and maximum VOQ buffer size threshold pair.

10. A non-transitory computer-readable storage medium comprising instructions for causing one or more programmable processors to:

determine, by a network device, a change in a drain rate at which network packets are forwarded from a Virtual Output Queue (VOQ) of an ingress forwarding unit of the network device to an egress forwarding unit of the network device, wherein the VOQ comprises a logical queue that corresponds to an output queue of the egress forwarding unit, wherein a size of the VOQ comprises a portion of a logical size of the output queue, wherein the logical size of the output queue is divided among a plurality of VOQs of a plurality of respective ingress forwarding units that includes at least the ingress forwarding unit, wherein the drain rate of the VOQ is based on a respective drain rate for each of the VOQs of the plurality of respective ingress forwarding units that is forwarding network packets to the egress forwarding unit; and in response to determining the change in the drain rate, modify, at the ingress forwarding unit, the size of the VOQ in direct proportion to the determined change in the drain rate.

11. A network device comprising:

a plurality of forwarding units each comprising a packet forwarding engine and an interface;

a switch fabric connecting the plurality of forwarding units, wherein an ingress forwarding unit for a packet flow internally forwards packets of the packet flow to an egress one of the forwarding units for the packet flow by the switch fabric;

an output queue of the egress forwarding unit, wherein the output queue is associated with the interface of the egress forwarding unit;

a Virtual Output Queue (VOQ) of the ingress forwarding unit that comprises a logical queue that corresponds to an output queue of the egress forwarding unit, wherein a size of the VOQ comprises a portion of a logical size of the output queue, wherein the logical size of the output queue is divided among a plurality of VOQs of a plurality of respective ingress forwarding units for the packet flow that includes at least the ingress forwarding unit; and a congestion manager of the ingress forwarding unit that determines a change in a drain rate at which network packets are forwarded from a Virtual Output Queue (VOQ) of an ingress forwarding unit of the network device to an egress forwarding unit of the network device, wherein the drain rate of the VOQ is based on a respective drain rate for each of the VOQs of the plurality of respective ingress forwarding units that is forwarding network packets to the egress forwarding unit, wherein the congestion manager, in response to determining the change in the drain rate, modifies the size of the VOQ in direct proportion to the determined change in the drain rate.

12. The network device of claim 11, wherein modifying the size of the VOQ comprises increasing a buffer size of the VOQ when the determined change in the drain rate is an increase in the drain rate.

13. The network device of claim 11, wherein the ingress forwarding unit receives a first packet of the packet flow by its interface, the network device further comprising:

a lookup module of the ingress forwarding unit that determines a forwarding next hop for the first packet that corresponds to the interface of the egress forwarding unit that is associated with the output queue and the VOQ, wherein the congestion manager drops the first packet if enqueuing the first packet to the VOQ would exceed the buffer size of the VOQ.

14. The network device of claim 13, wherein the congestion manager determines the drain rate, the network device comprising:

a VOQ bandwidth database of the ingress forwarding unit that stores one or more minimum and maximum VOQ buffer size threshold pairs for respective drain rates, wherein the congestion manager determines a current buffer size of the VOQ, wherein the congestion manager determines one of the minimum and maximum VOQ buffer size threshold pairs of the VOQ bandwidth database for the drain rate, and wherein the congestion manager drops the first packet if enqueuing the first packet to the VOQ would exceed the buffer size of the VOQ by dropping the first packet when the buffer size of the VOQ would exceed the maximum VOQ buffer size threshold of the determined minimum and maximum VOQ buffer size threshold pair.

15. The network device of claim 11,
wherein the congestion manager determines a logical size of the output queue by computing a product of (1) a delay bandwidth buffer configured for the output queue and (2) an egress interface port rate for the interface of the egress forwarding unit that is associated with the output queue, and
wherein the congestion manager sets an initial size of the VOQ to the logical size of the output queue.

16. The network device of claim 11, wherein the congestion manager determines a change in the drain rate by averaging multiple drain rate samples over a period of time.

17. The network device of claim 11, further comprising:
a VOQ state data structure of the ingress forwarding unit that stores a user-configured one of a port rate or a buffer size for the interface of the egress forwarding unit that is associated with the output queue,
wherein the congestion manager normalizes respective drain rates for the plurality of VOQs based at least in part on one of the configured port rate or buffer size for the interface of the egress forwarding unit that is associated with the output queue,
wherein the congestion manager modifies the size of the VOQ in direct proportion to the determined change in the drain rate by modifying the size of the VOQ in direct proportion to the determined change in the normalized drain rate of the VOQ.

18. The network device of claim 11, further comprising:
a rate profile data structure of the ingress forwarding unit, for the VOQ, that indicates a portion of a total port rate of the interface of the egress forwarding unit that is allocated to the output queue and comprises a shift value specifying bits of a time averaged drain rate for the VOQ that are significant;
normalization map of the ingress forwarding unit comprising one or more entries that each maps a shifted time averaged drain rate value to a normalized time averaged drain rate value,
wherein the congestion manager modifies determines the time averaged drain rate for the VOQ,
wherein the congestion manager shifts the time averaged drain rate by the shift value to compute a shifted time averaged drain rate for the VOQ; and
a normalization module of the ingress forwarding unit that maps the shifted time averaged drain rate for the VOQ to the normalized time averaged drain rate value using the normalization map,
wherein the congestion manager modifies the size of the VOQ in direct proportion to the determined change in the drain rate comprises modifying the size of the VOQ according to the normalized time averaged drain rate value.

19. The network device of claim 18, further comprising:
a size profile data structure of the ingress forwarding unit, for the VOQ, that indicates a size portion of a total buffer size of the interface of the egress forwarding unit that is associated with output queue;
a VOQ bandwidth database of the ingress forwarding unit that stores one or more minimum and maximum VOQ buffer size threshold pairs for respective time averaged drain rate and size portion pairs,
wherein the congestion module determines a current buffer size of the VOQ,
wherein the congestion module determines one of the minimum and maximum VOQ buffer size threshold pairs for the normalized time averaged drain rate value and the size portion, and
wherein the congestion module modifies the size of the VOQ according to the normalized time averaged drain rate value by setting the size of the VOQ to the maximum VOQ buffer size threshold of the determined minimum and maximum VOQ buffer size threshold pair.

* * * * *